P. LAVARELLO FU GIUSEPPE.
APPARATUS FOR REGULATING FLUID AND GAS PRESSURE BETWEEN THE GAS METER AND GAS CONSUMPTION.
APPLICATION FILED MAR. 6, 1918.
1,425,105.
Patented Aug. 8, 1922.
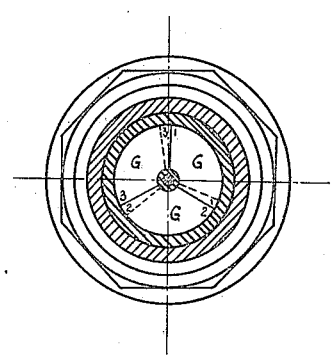
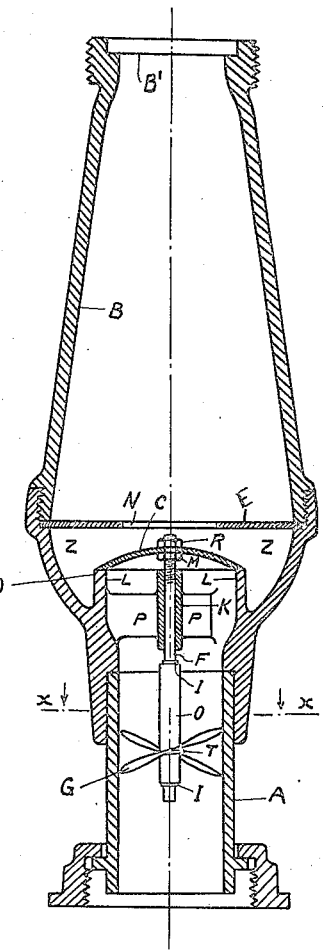
Inventor:-
Prospero Lavarello fu Giuseppe
by *Klinger*
Att'y

UNITED STATES PATENT OFFICE.

PROSPERO LAVARELLO FU GIUSEPPE, OF GENOA, ITALY.

APPARATUS FOR REGULATING FLUID AND GAS PRESSURE BETWEEN THE GAS METER AND GAS CONSUMPTION.

1,425,105.  Specification of Letters Patent.  Patented Aug. 8, 1922.

Application filed March 6, 1918. Serial No. 220,887.

*To all whom it may concern:*

Be it known that I, PROSPERO LAVARELLO, son of the late Giuseppe, a subject of the King of Italy, residing at Genoa, Italy, have invented a new and useful Improved Apparatus for Regulating Fluid and Gas Pressure between the Gas Meter and Gas Consumption; and I do hereby declare the following to be a full, clear, and exact description of the same.

The invention relates to an improved apparatus for controlling the pressure of a fluid between inlet and outlet pipes by intermittently shutting off the flow of gas so as to maintain a constant pressure.

The invention is primarily to be used for regulating pressure between a gas meter and the place of consumption but, of course, may be applied wherever it is expedient or important to maintain a predetermined or constant pressure.

It is an object of the invention to provide a differential valve in the passage between the inlet and outlet pipes such that the valve is actuated by the difference of pressure obtaining between inlet and outlet to respectively restrict or open the passage for the gas whereby a constant pressure is obtained.

It is a further object of the invention to provide a valve which either in the opening or closing movement has a concurrent rotary movement so that the binding between the valve and its seat is avoided.

It is also an object of the invention to employ in conjunction with the valve a diaphragm defining with the upper face of the valve a chamber the volume of which is regulated corresponding to the variance of pressure existing between the inlet and outlet pipes.

It is also an object of the invention to provide a governing valve which will maintain a constant pressure in the outlet pipe even when the pressure in the inlet pipe increases during a relatively long period.

To the accomplishment of the foregoing and related ends, which will readily appear from the following description, the invention comprises the application of means hereinafter set forth in the following specification and the claims forming a part thereof. The annexed drawing discloses in several embodiments the preferred form in which the invention is utilized without, however, exhausting the possible modifications and departures resting upon the principle upon which the invention is predicated.

In said drawing:

Fig. 1 is a longitudinal sectional elevation of an inlet and outlet pipe to which the invention has been applied; and Fig. 2 is a section on the line *x—x* of Fig. 1.

Referring to Figs. 1 and 2, A designates an inlet pipe which by suitable coupling means may be secured to a reservoir, gas meter, or any other receptacle constituting a repository for a quantity of fluid. The pipe A forms the extension of a casing or sleeve adapted to connect the pipe A with a conical elongated pipe B, provided with an opening B' for the egress of the fluid. Between the pipe B and the sleeve a diaphragm E is interposed which is equipped with a central aperture N to establish communication between a chamber Z and the pipe B. The sleeve is formed with the interior annular flange L constituting at its upper face a valve seat D with which the valve C cooperates to establish or interrupt communication between the inlet pipe A and the chamber Z. The valve C in the form of a concavo-convex plate is secured by means of nuts R, M to a spindle F which is arranged to reciprocate vertically in axial registry with the pipes A, B by being slidably fitted in a sleeve K arranged in a bracket P with which the sleeve is provided. On the spindle F a plurality of sleeves O are disposed to maintain the collar T in place, which is equipped with a plurality of propeller blades G for a purpose hereinafter further specified. The sleeves O are maintained in position on the spindle F by nuts I, arranged respectively above and below the sleeves.

The operation of the device is as follows: When the pressure in the chamber B constituting a reservoir is less than the pressure obtaining in the inlet pipe the thrust exerted upon the lower face of the valve C causes a lifting of the same. Simultaneously then the upwardly passing fluid acts on the propeller blades so as to impart a rotary motion to the valve with the result that when subsequently the valve occupies its normal position on the valve seat, the valve will have been rotated with respect thereto so that no binding effect will be set up. Assuming that the chamber B is not delivering any gas, i. e. that the pipe connecting the chamber B with the apparatus of consumption is closed, then the valve C will remain in elevated or lifted position sufficiently long until the pressure in the chamber B equals the pressure in the chamber A. If then these pressures are equal the valve C by reason of its gravity will descend and in its descending movement again the blades will rotate the valve so that when the valve has reached its normal original position it will have suffered a considerable rotation which partly continues until the valve is completely seated so that a grinding action is effected between the valve and its seat. The difference of pressure existing between the chamber A and the chamber B will cause the valve C to be lifted a corresponding distance so that in accordance with the difference of pressure a greater or lesser reduction of pressure is obtained by virtue of the coaction between the diaphragm E and the valve C whereby the volume of the chamber Z is more or less restricted. Thus it is obvious that irrespective of the difference of pressure which exists between the inlet and outlet pipes the pressure of gas which issues from the chamber B is constant.

Attention is called to the fact that the valve hub strikes the sleeve K before the concavo-convex valve plate completely closes the opening N.

As indicated in Fig. 2 the blades G of the propeller divide the cross-section of the pipe in three sectors 1—1, 2—2, 3—3, spirally arranged so that the upward thrust of the ascending fluid not only causes a rotation of the valve C but concurrently a lifting of the valve is enhanced.

By virtue of the described arrangement constant pressure in the outlet pipe is insured even when the pressure in the inlet pipe increases during a relatively long period. This is obtained by the decrease of the exhaust port in the diaphragm due to the ascent of the valve resulting in back pressure on the valve counteracting the tendency of the valve to ascend.

While the drawings disclose the preferred embodiment of the invention, various changes and modifications may be adopted within the spirit of the invention and it is therefore not my intention of confining myself to the details exactly as shown but to include all changes constituting departures within the scope of the invention as defined by the appended claims.

I claim:

1. In a device of the character described, the combination of an inlet pipe, an outlet pipe in axial alinement with each other, a pair of valve seats in axial alinement with said pipes and serially disposed therein, a valve normally seated by gravity on the valve seat next to the inlet pipe, a shaft connected with said valve, and means on said shaft adapted to rotate said shaft upon exertion of pressure in axial direction against said means for causing axial displacement of the valve from one of said seats in direction towards the other seat.

2. In a device of the character described, the combination of an inlet pipe and an outlet pipe joined to each other and in axial alinement with each other, a pair of valve seats axially alined with said pipes and separated from each other, a valve normally seated by gravity on one of said seats, a shaft fixed to said valve and freely rotatable in the inlet pipe, and a plurality of propelling wings mounted on said shaft and adapted upon exertion of pressure in axial direction against said wings to rotate the shaft and move the same axially to convey the valve from one seat towards the other seat.

In testimony whereof I affix my signature in presence of two witnesses.

PROSPERO LAVARELLO fu GIUSEPPE.

Witnesses:
  CARBONE VINCENZO,
  PIO RINALDINI.